Figure 1:
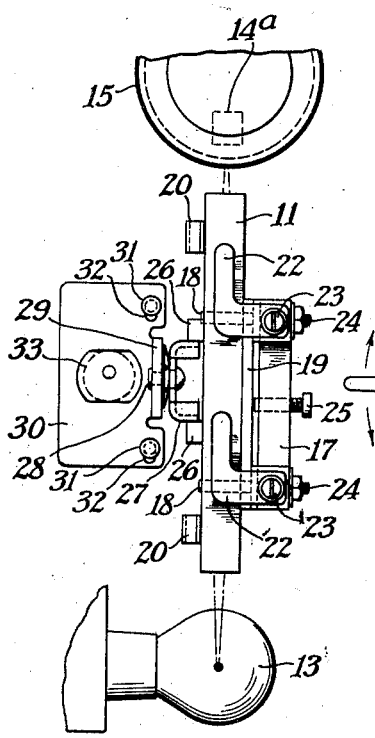

Jan. 12, 1943.    J. H. McLEOD    2,308,015
SOUND REPRODUCTION
Filed Oct. 18, 1940

JOHN H. McLEOD
INVENTOR

BY
ATTORNEYS

Patented Jan. 12, 1943

2,308,015

UNITED STATES PATENT OFFICE 2,308,015

SOUND REPRODUCTION

John H. McLeod, Rochester, N. Y., assignor to Eastman Kodak Company, Rochester, N. Y., a corporation of New Jersey Application October 18, 1940, Serial No. 361,756

4 Claims. (Cl. 179—100.3)

This invention relates to improvements in the reproduction of sound electrooptically and particularly to an improved method and means for tone control by variably cutting off the higher frequencies which may be reproduced.

It has long been known that the frequency range of sound recorded on a film which may be reproduced electrooptically is determined by the speed of the film and the width of the light beam employed for scanning purposes. Heretofore the scanning beam whether provided by a physical slit or an optical slit has been made as narrow as possible to the end that the highest possible frequencies might be resolved.

The principal object of this invention is to provide improved means and a method for controlling the frequency response in sound reproduction and particularly for variably cutting off undesirable high frequencies.

Another object of the invention is to provide simple means for adjusting the sound optics of a reproducer so as to obtain the desired width of scanning beam.

Other objects and advantages of the invention will be come apparent from the following description taken in conjunction with the accompanying drawing. It will be obvious that many changes may be made in the details of the arrangement described as the preferred embodiment without departing from the invention as defined in the appended claims.

In accordance with the preferred embodiment of the invention as applied to sound optics of the optical slit type the scanning beam i. e., the optical slit, is conveniently increased in width by throwing the lens system comprising the sound optics slightly out of focus. This reduces the frequency response of the system and I have found that this method of tone control is particularly effective in reducing the film hiss that is usually present in sound records made on reversal film. Apparently, the high frequency cut is sharper than that usually obtained with electrical means so that the intermediate frequencies are not affected as much as when electrical methods are employed.

Figure 2:
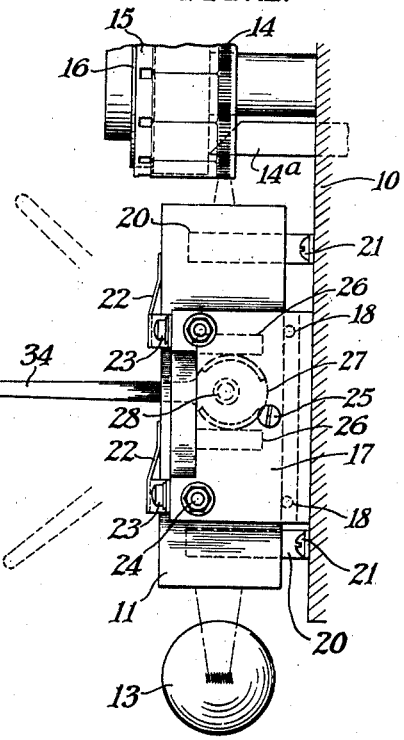
Figure 3:
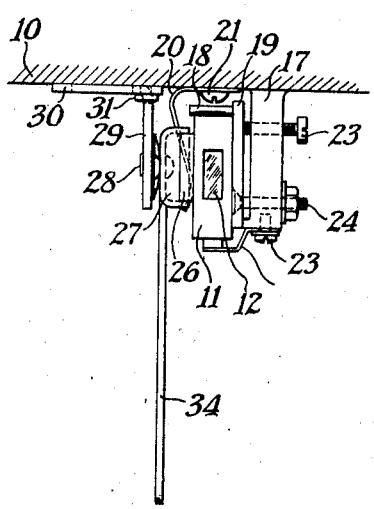
Figure 4:
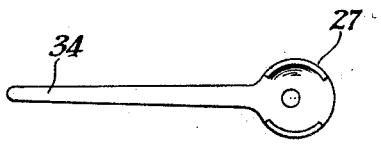

In the drawing in which only those parts necessary for a complete understanding of the invention are shown:

Fig. 1 is a side view, Fig. 2 is a top view, and Fig. 3 is an end view of a preferred embodiment of an adjustable mounting for sound optics for practicing the invention; and Fig. 4 is a plan view of a suitable cam lever employed for securing accurate and minute adjustments.

In the drawing the invention is shown as applied to sound reproducing apparatus including a rigid frame 10 which supports a mount 11 for a suitable optical system including a lens 12 for focusing light from a suitable source 13 in a narrow line on a sound track 14 carried by a transparent band 15. The optical system including the lens 12 may be of any well known type such as the one shown in my Patent No. 2,161,368 which issued June 6, 1939. Suitable means such as a drum 16 moves the film band 15 in any well known manner so that the sound record 14 modulates the light which it transmits and this modulated light is directed by a prism 16 onto a light sensitive device, not shown, which translates it into sound in the usual way.

In accordance with the invention the mount 11 is supported by the frame 10 in such a way as to permit adjustment of the scanning line of light. One suitable arrangement for supporting the mount 11 is shown in the drawing as comprising a member 17 projecting from the frame 10 and provided with pins 18 against which one edge of the mount 11 abuts. This projecting member 17 also carries a plate 19 against which a side of the preferably rectangular mount 11 is held by suitable spring members 20 which may be secured to the frame 10 by screws 21. Retaining springs 22 urge the mount 11 against the pins 18 and may be pivotally secured to the projection 17 by headed screws 23 so that they may be rotated to permit easy removal of the mount 11 for cleaning or any other purpose.

In order that the line of light provided by the optics in mount 11 may be properly alined with the sound record 14, i. e., perpendicular to the direction of travel of the record, the plate 19 is made adjustable as by securing it to the projection 17 by retaining bolts 24 and a set screw 25 whereby correct azimuth adjustment may be made at the factory.

The arrangement thus far described is merely one of many suitable for the purpose of adjusting the width of the scanning beam in accordance with the invention. One suitable and simple arrangement for securing the desired adjustment of the scanning beam will now be described.

The mount 11 is provided on its side opposite the side engaging the plate 19 with two spaced cam shoes 26 between which is positioned a cam 27 pivoted on a pin 28 secured to a flange 29 formed on a plate 30. The plate 30 is secured to the frame 10 by screws 31 extending through slots 32 in the plate 30. These slots 32 are elongated in a direction parallel to the length of the mount 11 and permit factory adjustment of the position of the cam 27 as by means of a cam tool 33 after which the screws 31 are tightened and the cam tool is removed.

The cam 27 is provided with a relatively long arm 34 which functions as a focusing lever when moved as indicated by the arrows in Fig. 2 between the positions shown in broken lines. Such movement of the lever 34 rotates the cam 27 to move the mount 11 towards and away from the sound record 14 in accordance with the eccentricity of the cam 27 and the direction of movement of the lever arm 34.

It is preferred to provide that the total focusing movement of the mount 11 be such that in one extreme position the scanning beam is focused on the front surface of the film 15 and in the other extreme position it is focused on the rear surface of the film 15, and being adjustable to all intermediate positions to provide a tone control. These extreme positions may be established by properly shaping the cam 27 but preferably they are established by limiting the angular movement of the lever arm 34 which can conveniently be done by providing suitable stop members on the casing which will normally enclose the scanning system.

It is to be understood that the embodiment shown and described in detail is merely illustrative of the invention and that many other arrangements are obviously available for selectively varying the width of the scanning beam.

Although the invention has been shown as applied to sound reproduction from a transparent support it will be apparent that the invention may be practiced to advantage in systems where the scanning beam is modulated by reflection as well as in systems employing the so-called inverse optical system for scanning.

What I claimed as new and desire to secure by Letters Patent of the United States is:

1. In an electro-optical sound reproducing system in which a narrow beam of light scans a sound record, the method of controlling the tone of the reproduced sound which comprises regulating the width of the scanning beam above the narrowest width to alter the resolving power of the system in accordance with the frequency response desired, whereby undesirable high frequencies are selectively cut off and not reproduced.

2. Film-type phonographic apparatus comprising an optical system adapted to form a luminous scanning image of sufficient thinness to reproduce a predetermined high frequency, means adjustable during operation of the apparatus to increase gradually the thickness of said image, and means for limiting the adjustment of said adjustable means to assure that said image will not be increased beyond a predetermined thickness.

3. In apparatus for electro-optically reproducing sound from a record band moving at a predetermined rate, an optical system for directing onto the record band a scanning beam, means for continuously adjusting the optical system for altering the width of the scanning beam whereby the resolving power of the system is continuously altered, means for limiting in one direction the adjustment of the optical system to its position of greatest resolving power, means for limiting in the other direction the adjustment of the optical system to a position at which the system's resolving power is lowered a predetermined desired amount, whereby the high frequency cut-off is continuously variable between two predetermined limits.

4. Apparatus as claimed in claim 3 wherein said two predetermined limits of adjustment are spaced a distance substantially equal to the optical thickness of the record band, whereby the optical system may be quickly adjusted to its position of greatest resolving power for scanning a record carried by either surface of said band.

JOHN H. McLEOD.